(12) United States Patent
Mir

(10) Patent No.: US 6,385,027 B1
(45) Date of Patent: May 7, 2002

(54) NOISE PROTECTION DEVICE

(75) Inventor: Andrew Mir, Reading (GB)

(73) Assignee: Mars Incorporated, McLean, VA (US)

( * ) Notice: Subject to any disclaimer, the term of this patent is extended or adjusted under 35 U.S.C. 154(b) by 0 days.

(21) Appl. No.: 09/444,852

(22) Filed: Nov. 22, 1999

(30) Foreign Application Priority Data

Nov. 24, 1998 (GB) .............................................. 9825727

(51) Int. Cl.⁷ ................................................ H02H 1/04
(52) U.S. Cl. ........................ 361/110; 361/119; 327/198
(58) Field of Search .................... 340/310.03; 343/703; 324/520, 613, 110; 375/346, 351; 455/222, 223, 296, 298; 705/418; 361/111, 119, 110; 327/143, 198, 545, 551, 594

(56) References Cited

U.S. PATENT DOCUMENTS

| | | | |
|---|---|---|---|
| 4,096,560 A | | 6/1978 | Footh ........................... 714/22 |
| 5,144,515 A | | 9/1992 | Fruhauf et al. ................ 361/18 |
| 5,612,643 A | | 3/1997 | Hirayama .................... 327/534 |
| 5,842,037 A | * | 11/1998 | Haartsen ..................... 455/296 |
| 6,038,491 A | * | 3/2000 | McGarry et al. ........... 700/231 |

FOREIGN PATENT DOCUMENTS

| | | | | |
|---|---|---|---|---|
| EP | 0 513 952 A2 | 11/1992 | ........... G06F/11/00 |
| EP | 0 874 335 A1 | 10/1998 | ............. G07F/9/08 |

* cited by examiner

Primary Examiner—Ronald W. Leja
(74) Attorney, Agent, or Firm—Fish & Richardson P.C.

(57) ABSTRACT

A circuit for protecting a microprocessor in a controller for controlling a coin validator from noise includes a noise detector and the circuit is configured to temporarily halt the microprocessor when noise is detected.

9 Claims, 1 Drawing Sheet

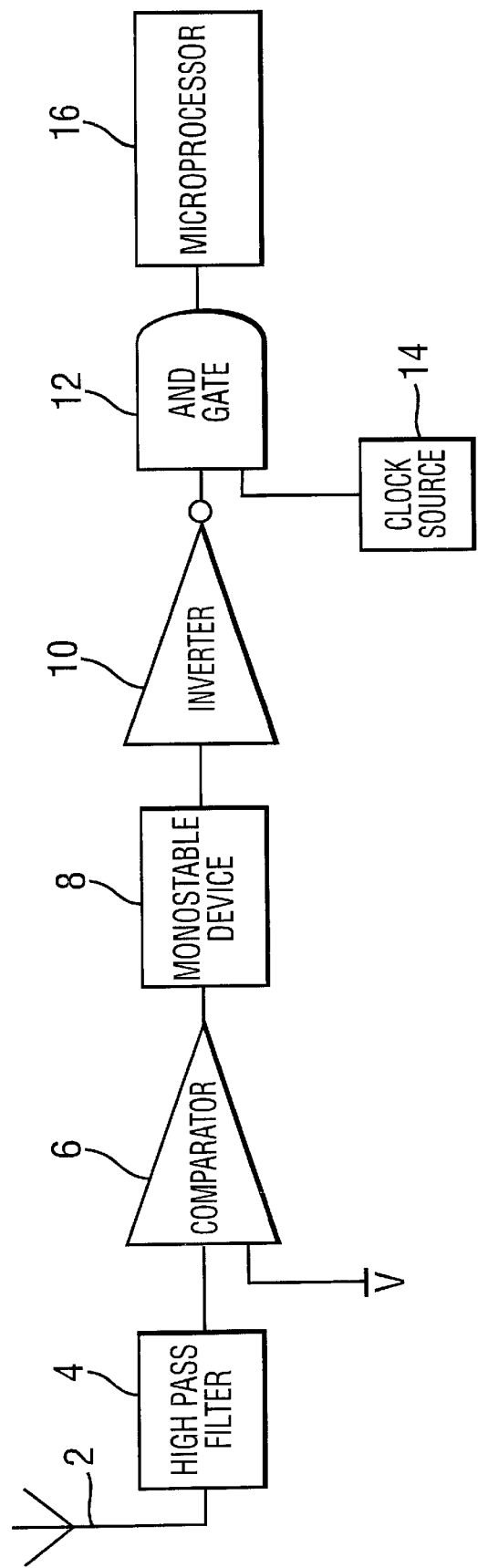

NOISE PROTECTION DEVICE

The present invention relates to a circuit for protecting a microprocessor from noise. The invention is intended for use especially in association with a coin validator, as described for example in GB 2284090, the contents of which are incorporated herein by reference.

Noise in the form of unwanted electrical signals in a circuit arising from the environment can cause the circuit to malfunction. A known method of removing noise uses filters to filter out signals of particular frequencies. A problem with that approach is that the filters require large inductive and capacitive components, which increases the size and cost of the circuits.

The invention provides a circuit for protecting a microprocessor in a controller for a currency validator from noise comprising means for detecting noise and means for temporarily halting the microprocessor when noise is detected.

As a result of the invention, it is not necessary to provide bulky components for removing noise signals. The halting of the microprocessor can prevent adverse consequences of high frequency interference.

The invention also provides a controller for a coin validator comprising a circuit as described above.

BRIEF DESCRIPTION OF THE DRAWINGS

An embodiment of the invention will be described with reference to the accompanying drawing:

FIG. 1 is a block diagram of a circuit.

A block diagram of a circuit according to an embodiment of the invention is shown in FIG. 1. The circuit has an aerial 2 for receiving high frequency signals in the environment. The aerial is connected to the input of a filter 4, which is a high pass filter for passing the high frequency noise signals. The output of the filter 4 is connected to a level detector in the form of a comparator 6. More specifically, the output of the filter is connected to one input of the comparator 6 and compared with a fixed level connected to the other input of the comparator 6. The output of the comparator 6 is connected to an monostable device 8. The monostable device 8 is adjustable and in this embodiment is set to a period of 0.5 seconds. The output of the monostable device 8 is connected by way of an inverter 10 to one input of an AND gate 12. A clock source 14 is connected to the other input of the AND gate 12. The output of the AND gate is connected to a controller in the form of a microprocessor 16.

As described in more detail below, in operation, when noise is not detected, the output from the inverter 10 is high, and the output from the AND gate 12 connected to the microprocessor 16 corresponds to the signal from the clock source 14. When noise is detected by the circuit, the output from the inverter 10 connected to the AND gate 12 goes low, thereby turning off the connection between the clock source 14 and the microprocessor 16 and halting the microprocessor.

More specifically, in operation, the aerial 2 continuously monitors the environment and picks up external signals that may influence the operation of the circuit. Signals from the aerial 2 are filtered by the high pass filter 4 to identify the more troublesome high frequency signals. Furthermore, the high frequency signals are input to the comparator 6 to identify whether or not the amplitude of the signals exceeds a given predetermined value V.

If there are no high frequency signals greater than the predetermined value V, then the signal from the clock source 14 is input to the microprocessor by way of the AND gate 12.

If the comparator 6 identifies a high frequency signal having an amplitude higher than the predetermined value, then it outputs the noise above that threshold. The output of the comparator 6 then triggers the monostable device 8, which outputs a pulse. When the output from the monostable device 8 is high, then the corresponding input of the AND gate 12 is taken low by the inverter 10, thereby interrupting the signal from the clock source 14 to the microprocessor 16 and halting the microprocessor.

When the noise above the threshold ends, the pulse from the monostable device 8 continues for the set period, in this case 0.5 seconds from the end of the noise, then the output from the monostable 8 goes low, and the signal from the clock source 14 is restored, restarting the microprocessor.

Other arrangements for a circuit according to the invention are possible. For example, the period for which the microprocessor is switched off is not limited to the periods given above. In the above embodiment, the circuit acts to halt the microprocessor for a predetermined period after the detected noise stops. Alternatively, the circuit may operate to halt the microprocessor for a predetermined period after the noise is detected. In the above embodiment, noise detection is effected using an aerial. Alternatively, the circuit may be connected, for example, to the power supply, or any other part of a circuit, for detecting noise in a signal. The microprocessor may be halted by, for example, applying a signal to an inhibit terminal on the microprocessor, instead of by disabling the clock signal.

What is claimed is:

1. A circuit for protecting a microprocessor in a controller which controls a currency validator from noise comprising a noise detector, and wherein the circuit is configured to temporarily halt the microprocessor when noise is detected.

2. A circuit as claimed in claim 1 further comprising a clock source for supplying a clock signal to the microprocessor, and wherein the microprocessor is halted by disabling supply of the clock signal.

3. A circuit as claimed in claim 1 wherein the noise detector comprises an aerial.

4. A circuit as claimed in claim 1 wherein the noise detector comprises a comparator for identifying when the noise exceeds a predetermined amplitude.

5. A circuit as claimed in claim 1 wherein the microprocessor is halted for a predetermined period which is adjustable.

6. A circuit as claimed in claim 1 further comprising a monostable device to determine a period for which the microprocessor is halted.

7. A circuit as claimed in claim 1 wherein the microprocessor is halted for a period of 0.5 seconds or less from the detection of noise.

8. A circuit as claimed in claim 1 arranged for detecting noise on a power supply.

9. A method for protecting a controller which controls a currency validator from noise comprising monitoring the environment for noise; detecting noise; and temporarily halting the operation of the controller when noise is detected.

* * * * *